United States Patent [19]

Leonardi

[11] 4,152,860
[45] May 8, 1979

[54] FISHHOOKS

[76] Inventor: Samuel Leonardi, 809 NW. 7th Terr., Fort Lauderdale, Fla. 33311

[21] Appl. No.: 872,110

[22] Filed: Dec. 22, 1977

[51] Int. Cl.² ............................................. A01K 85/00
[52] U.S. Cl. ...................................................... 43/37
[58] Field of Search ............... 43/6, 34, 37, 42.02, 43/43.16, 43.2, 43.4, 43.6, 44.6, 44.8

[56] References Cited

U.S. PATENT DOCUMENTS

| | | | |
|---|---|---|---|
| 2,080,238 | 5/1937 | Stoner | 43/34 |
| 2,640,291 | 6/1953 | Garner | 43/37 |
| 2,795,074 | 6/1957 | Loomis | 43/37 |
| 3,618,251 | 11/1971 | Hodshire | 43/34 X |

Primary Examiner—Nicholas P. Godici
Assistant Examiner—Robert P. Olszewski
Attorney, Agent, or Firm—Cushman, Darby & Cushman

[57] ABSTRACT

A fishhook adapted to prevent the escape of a hooked fish. In one embodiment, once a fish has been hooked in a conventional manner upon the conventional portion of the fishhook, the tension on the line causes a spearing member, slidably attached to the conventional portion of the fishhook, to enter the fish in a location and at an angle different from the location and angle of entering of the barb of the conventional portion of the fishhook, thus insuring capture of the fish. In a second embodiment, a flair on the end of the spearing member nearest the barb of the conventional portion causes the spearing member to enter the fish as the fish becomes hooked in a conventional manner.

8 Claims, 6 Drawing Figures

U.S. Patent        May 8, 1979        4,152,860
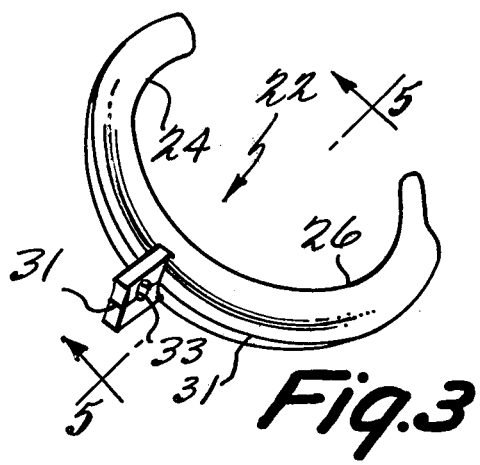
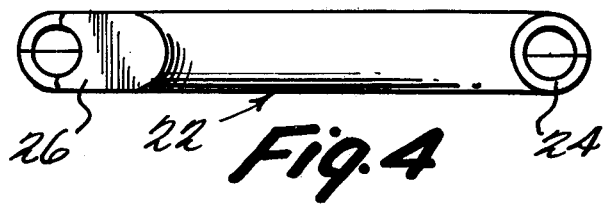
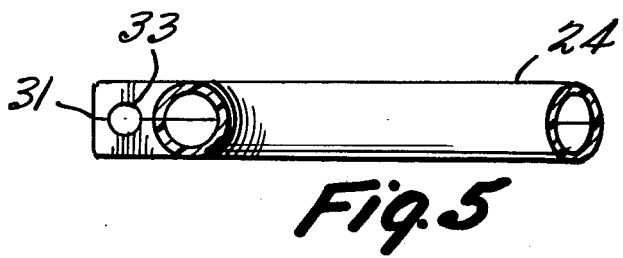
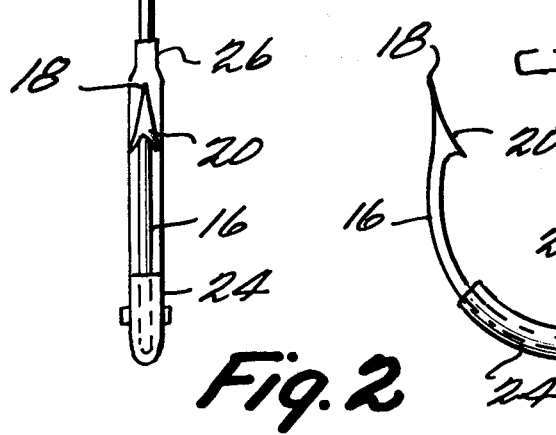
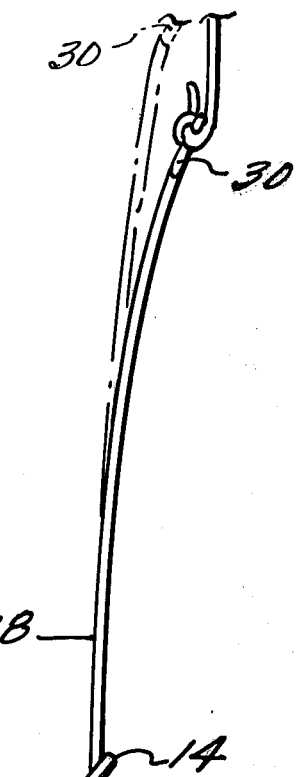
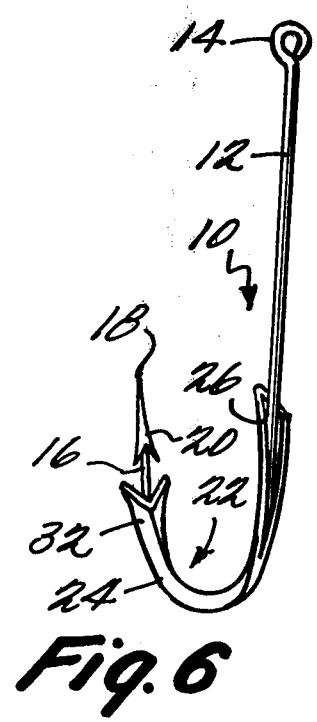

FISHHOOKS

American folklore is replete with stories of "the one that got away." The present invention relates to a device that assists in guaranteeing that stories of "the one that got away" are truly "fish stories" and more particularly, to a fishhook adapted to prevent the escape of the fish once it has been hooked.

Prior apparatus for increasing the likelihood of capturing a fish once it has been hooked, in general, are known. In most cases this involves either the entry of a second spear into the fish or the movement of a latching device towards the bill of the hook. Examples of this type of improved fishhook are disclosed in the following patents: U.S. Pat. Nos. 779,843 Fredricks; 1,604,031 Ferguson; 2,080,238 Stoner; 2,629,959 Dalton; 2,864,198 Edwards; 2,924,482 Gibson; 2,948,985 Kizer; 2,996,828 Williams.

The present invention relates to a fishhook including a C-shaped spearing member having a curved portion shaped similarly to the curved part of a conventional hook, slidably attached to the curved portion of the hook. The spearing portion of the C-shaped spearing member is not directly attached to the hook, but is shaped in such a way that when the curved portion slides towards the barb of the hook, the tip of the spearing portion moves away from the barb, and when the curved portion slides away from the barb, the tip of the spearing portion moves toward the barb.

In one embodiment, a wire, attached at one end to the spearing member and threaded through the loop in the top of the hook, is attached at the other end to the fishing line. When a fish becomes caught on the hook in a conventional manner and tension is applied to the fishing line, the wire pulls the spearing member away from the barb causing the spearing portion of the spearing member to move toward the barb and enter the fish in a location different from the location the barb entered the fish.

In a second embodiment, the end of the curved portion nearest the barb of the conventional part of the fishhook is flaired. When a fish becomes hooked in a conventional manner and pulls away from the hook, the fish becomes more deeply impaled on the fishhook, thereby causing the spearing portion of the spearing member to move toward the barb as described above.

This arrangement produces several advantages over the prior art. As the fish struggles harder and the tension on the line increases, the spearing member becomes more firmly attached to the fish. The above-cited patents, except Fredricks, disclose a second hooking or spearing member that is powered independent of the tension on the line. Thus, in the prior art, the degree to which the second hooking or spearing member becomes inserted within the fish is independent of the degree to which the fish is struggling.

A further advantage of the present invention over some of the prior art including Fredricks, is that two hooking or spearing members can enter the fish. In the Fredricks patent, tension on the line causes a shank to swing out from the hook so that the tip of the shank approaches the bill, thereby locking the fish onto the hook. The shank is not specifically designed to penetrate the fish in order to hold it by a second member.

An advantage of the present invention is that it does includes a second spearing member powered by the tension on the hook and fishing line, an advantage not found in any of the above-cited references. Other objectives and advantages of the invention will become more apparent and more readily appreciated from the following detailed description of the presently preferred exemplary embodiment of the invention taken in conjunction with the accompanying drawings of which:

FIG. 1 is a side elevation of a first embodiment of the invention;

FIG. 2 is a front elevation of a portion of the first embodiment of the present invention;

FIG. 3 is a perspective view of the C-shaped spearing member of the present invention;

FIG. 4 is a side elevation of the spearing member looking into the opening of the "C";

FIG. 5 is a sectional view of the spearing member taken along the 5—5 line of FIG. 3; and FIG. 6 is a perspective view of a second embodiment of the present invention.

Referring now to FIGS. 1-5, U-shaped shank 10 has long arm 12 ending in loop 14 and shorter arm 16 ending in pointed bill 18 and barb 20. C-shaped spearing member 22 has curved portion 24 which is attached to the curved portion of shank 10 and which slides along the curved portion of shank 10, while spearing portion 26 of spearing member 22 is not attached to shank 10. As spearing member 22 slides towards bill 18, spearing portion 26 of spearing member 22 moves away from bill 18 (as shown in FIG. 1 in solid lines), and when spearing member 22 slides away from bill 18, spearing portion 26 approaches bill 18 (as shown in FIG. 1 in broken lines).

Wire 28 is attached to spearing member 22, and is guided along longer arm 12 of shank 10 by passing through loop 14 at the end of longer arm 12. The end of wire 28 is formed in a loop 30 to which the fishing line is attached.

Alternatively, spearing member 22 can be constructed with a split along the entire length of seam 31 (as shown in FIG. 3), so that it can be attached to any conventional fishhook of an appropriate size. After wire 28 is passed through hole 33 in spearing member 22, it is wrapped several times around spearing member 22 to assure that split spearing member 22 will remain attached to shank.

In operation, spearing member 22 is slid towards bill 18 as the hook is baited, and is held in that position by friction and the bait. When a fish takes hold of the bait and becomes hooked in a conventional manner on bill 18 and barb 20, the tension created in the fishing line and wire 28 pulls spearing member 22 away from bill 18 which causes spearing portion 26 of spearing member 22 to approach bill 18. Spearing portion 26 will then enter the fish in a location and at an angle different from the location and angle that bill entered the fish, thereby increasing the changes of the capture thereof.

FIG. 6 illustrates a second embodiment of the present invention. U-shaped shank 10 and C-shaped spearing member 22 are as described above, except that curved portion 24 has flaired end 32. In operation, as a fish becomes hooked in a conventional manner and tries to pull away from the hook, the fish becomes more deeply impaled on the fishhook. Flaired end 32 of spearing member 22 is pushed away from bill 18 causing spearing portion 26 of spearing member 22 to approach bill 18. Spearing portion 26 will then enter the fish as described above.

Although only two exemplary embodiments of this invention have been described in detail above, those skilled in the art will readily appreciate that many modifications are possible in the exemplary embodiments without materially departing from the novel teachings and advantages of this invention. For example, shorter arm 16 need not have a pointed bill 18 and barb 20, although on the other hand, spearing portion 26 may additionally have a pointed bill and barb. Accordingly, all such modifications are intended to be included within the scope of this invention as claimed in the following claims.

What is claimed is:

1. A fishhook comprising:
a U-shaped shank having arms of unequal length, the longer arm forming a stem;
C-shaped spear means having first portion shaped similarly to the curved portion of said shank, said first portion being slidably attached to said curved portion, and having a second portion not attached to said shank so that when said first portion slides toward the shorted arm of said shank, the tip of said second portion moves away from the tip of said shorter arm, and when said first portion slides away from said shorter arm, said second portion tip moves toward said shorter arm tip; and
means for energizing said C-shaped spear means solely by the movement of a fish with respect to said fishhook and an attached fishing line so that when a fish becomes caught on said shorter arm in a conventional manner, the movement of said fish with respect to said fishhook and an attached fishing line causes said second portion to move toward said shorter arm tip and enter said fish in a location different from the location said shorter arm entered said fish, thereby increasing the chances of the capture thereof.

2. Apparatus as in claim 1 wherein said means for energizing comprises:
a wire having a first end attached to said spear means;
guiding means attached to said longer arm for guiding said wire along said longer arm; and
connecting means attached to the second end of said wire for connecting said wire to a line do that when a fish becomes caught on said shorter arm in a conventional manner and tension is applied to said line, said wire pulls said spear means away from said shorter arm, causing said second portion to move toward said shorter arm tip and enter said fish in a location different from the location said shorter arm entered said fish, thereby increasing the chances of the capture thereof.

3. Apparatus as in claim 1 wherein said means for energizing comprises a flaired portion at the end of said second portion closest to said tip of said shorter arm so that when a fish becomes caught on said shorter arm in a conventional manner, the movement of said fish away from said fishhook will cause said fish to become more deeply impaled on said fishhook thereby causing said second portion to move toward said shorter arm tip and enter said fish in a location different from the location said shorter arm entered said fish, thereby increasing the chances of the capture thereof.

4. Apparatus as in claim 1 wherein said shorter arm has a pointed bill and barb at its tip.

5. Apparatus as in claim 2 wherein said guiding means is a loop at the end of said longer arm.

6. Apparatus as in claim 2 wherein said connecting means is a loop at said second end of said wire.

7. Apparatus as in claim 1 wherein said second portion is sharpened.

8. Apparatus as in claim 1 wherein said second portion enters said fish at an angle different from the angle of entry of said shorter arm.

* * * * *